United States Patent Office 3,463,660
Patented Aug. 26, 1969

3,463,660
PROCESS FOR OBTAINING AN ANTI-STICK SURFACE WITH AN ORGANOSILICON AND AN ORGANOPOLYSILOXANE AND A COOKING UTENSIL SO TREATED
Roy Bentley, Largs, and John Craig, Paisley, Scotland, assignors to Imperial Chemical Industries Limited, London, England, a corporation of Great Britain
No Drawing. Filed May 4, 1966, Ser. No. 547,411
Claims priority, application Great Britain, May 11, 1965, 19,830/65
Int. Cl. B44d 5/08, 1/36
U.S. Cl. 117—72     26 Claims

ABSTRACT OF THE DISCLOSURE

Surfaces of wood, glass, metal and enamel are rendered anti-stick by treating the surfaces in the presence of an acid with a liquid organosilicon having at least one $\equiv$Si—H linkage and at least three $\equiv$Si—OR linkages, where R is a monovalent hydrocarbon radical or a hydrocarbonoxy radical, and allowing the surface to dry and thereafter applying thereto a linear organopolysiloxane containing at least one silicon-bonded hydroxyl group.

---

This invention relates to a process for treating surfaces, for example, of wood, metal, glass, enamel or the like, with organopolysiloxanes.

Surfaces of wood, metal, glass, enamel and the like have been treated with organopolysiloxanes for a variety of reasons, for example, to confer on them water-repellency or anti-stick properties. The hitherto available treatments have not, however, been entirely satisfactory in all cases.

According to the present invention a new and improved process for treating surfaces of wood, metal, glass, enamel or the like, comprises applying to the surface, in presence of a small amount of acid, a liquid organosilicon compound containing at least one $\equiv$Si—H group and at least three $\equiv$SiOR groups per molecule, where R is a monovalent hydrocarbon radical or a hydrocarbonoxy radical, allowing the surface to dry and thereafter applying thereto a linear organopolysiloxane containing at least one silicon-bonded hydroxyl group.

A wide variety of liquid organosilicon compounds containing at least one $\equiv$SiH group and at least three $\equiv$SiOR groups may be used in our process. The groups R may be, for example, methyl ethyl, propyl, butyl, phenyl, phenylethyl, vinyl or $\beta$-ethoxy-ethoxy groups. Types of compounds which may be used include silanes and siloxanes in which any remaining silicon valencies are occupied by hydrocarbon groups, hydrocarbonoxyl groups or ether-hydrocarbonoxyl groups, or such groups containing one or more substituents. Suitable compounds include, for example, triethoxy-silane, tri-isobutoxysilane, tris-($\beta$-ethoxy-ethoxy) silane and 1,1,3,3-tetraethoxydisiloxane and in many cases triethoxysilane is preferred. The amount of the liquid organosilicon compound used may vary widely. Normally amounts of the order of from 1.25 to 17 g./m.$^2$ are adequate and no advantage is obtained by using larger amounts.

The liquid organosilicon compound may, if desired, be diluted with a solvent before application. Solvents suitable for this purpose include, for example, toluene, xylene and isopropanol and in many cases toluene is preferred. The compound or its solution may be applied by brushing or spraying or, preferably, by wiping with a pad soaked therewith. The surface should be allowed to dry after the application and before applying the hydroxyl-containing compound.

A variety of acids may be used with the organosilicon compound. For many purposes acetic acid is preferred because of its ready availability and non-toxic nature. Other acids for example, hydrochloric acid can, of course, also be used. The amount used should, in general, be such that a moistened Universal indicator paper does not show a pH greater than 4, when moistened with the organosilicon compound and acid. Amounts up to about 1 percent by weight of the organosilicon compound are normally adequate. Greater amounts give no advantages and indeed may show disadvantages such as staining of the surface being treated. Because of the amounts of acid used it is preferred that it be incorporated in the organosilicon compound.

The linear organopolysiloxane may have only one hydroxyl group in which case it is preferably at one end of the molecular chain. Alternatively, there may be more than one hydroxyl group in which case it is preferred that two of these are at the ends of the chain. The organo groups in the organopolysiloxane may be alkyl, aryl, aralkyl, alkaryl, cycloalkyl or alkenyl groups. Suitable groups include for example methyl, phenyl, phenylethyl, cyclohexyl and vinyl groups. For many purposes methyl groups are, however, preferred. The amount of linear organopolysiloxane applied may vary widely, for example, from 3.3 g. to 17 g./m.$^2$ No advantage is obtained by applying excessive amounts. The siloxanes may be applied by any suitable means, for example, such as brushing, spraying or dipping or by wiping with a pad soaked therewith. The siloxane may be applied, if desired, in the form of a solution. For this purpose suitable solvents which may be used include, for example, toluene and xylene. Any excess of polysiloxane or solution thereof may be removed by being allowed to drain from the surface.

Other organopolysiloxanes which need not necessarily be linear may also be incorporated in the hydroxyl-containing organopolysiloxane. It is normally preferred that these, if used, should be present in amount not more than 20 percent by weight of the hydroxyl-containing organopolysiloxane.

For many purposes it is advantageous and in some cases may be desirable to incorporate a catalyst in the linear organopolysiloxane. A wide variety of catalysts may thus be admixed with the linear organopolysiloxanes. Catalysts such as amines, amine salts, tin salts of carboxylic acids and quarternary ammonium salts may be used. Suitable catalysts include, for example, aminobutanol, dibutyl tin dilaurate, choline octoate and diethylamine. For many purposes aminobutanol is preferred. The catalyst may be used in amount from 0.25 to 1 percent by weight of the linear organopolysiloxane and preferably from 0.4 to 0.6 percent.

Although in general no further treatment is necessary, a degree of heating is advantageous. This may be achieved, for example, by the application of boiling water to the treated surface.

The process of our invention gives excellent anti-stick properties and is particularly suitable for use on cooking utensils.

Our invention is further illustrated by the following examples in which all parts and percentages are by weight.

EXAMPLE 1

An aluminum pan of diameter 10 inches was cleaned and dried in order to remove any grease present. The interior surface was wiped with a felt pad impregnated with an 80 percent solution of triethoxysilane in isopropanol and containing one percent of glacial acetic acid. The pan was then allowed to dry for 5 minutes and coated with a toluene solution containing 50 percent of a linear hydroxyl-ended dimethylpolysiloxane of viscosity 900 cps. at 25° C. and 0.5 percent of 2-amino-1-butanol. After a further five minutes drying the pan was half filled with water which was then boiled for thirty seconds.

An egg was then cooked in the pan without fat. A perfect release of the cooked egg was obtained.

EXAMPLE 2

The procedure of Example 1 was repeated except that there was used a 75 percent solution in toluene of the same dimethylpolysiloxane. The same perfect release was obtained.

EXAMPLE 3

The procedure of Example 1 was repeated except that the triethoxysilane and polysiloxane were used undiluted by solvent. The same perfect release was obtained.

EXAMPLE 4

The procedure of Example 3 was repeated except that the polysiloxane was used in the form of a 90 percent solution in toluene. The same perfect release was obtained.

EXAMPLE 5

The procedure of Example 4 was repeated except that the polysiloxane was used in the form of an 80 percent solution in toluene. The same perefect release was obtained.

EXAMPLE 6

The procedure of Example 4 was repeated except that the polysiloxane was used in the form of a 50 percent solution in toluene. The same perfect release was obtained.

EXAMPLE 7

The procedure of Example 3 was repeated except that the triethoxysilane was used in the form of an 80 percent solution in toluene. The same perfect release was obtained.

EXAMPLE 8

The procedure of Example 3 was repeated except that the triethoxysilane was used in the form of a 95 percent solution in toluene. The same perfect release was obtained.

EXAMPLE 9

The procedure of Example 3 was repeated except that the triethoxysilane was used in the form of a 90 percent solution in toluene. The same perfect release was obtained.

EXAMPLE 10

The procedure of Example 3 was repeated except that the triethoxysilane was used in the form of a 50 percent solution in toluene. The same perfect release was obtained.

EXAMPLE 11

The procedure of Example 6 was repeated except that the polysiloxane was used in the form of a 50 percent solution in toluene. The same perfect released was obtained.

EXAMPLE 12

The procedure of Example 3 was repeated except that the 2-amino-1-butanol was replaced by 0.5 percent of choline octoate. The same perfect release was obtained.

EXAMPLE 13

The procedure of Example 3 was repeated except that the 2-amino-1-butanol was replaced by 0.5 percent of dibutyl tin dilaurate. The same perfect release was obtained.

EXAMPLE 14

The procedure of Example 3 was repeated except that the 2-amino-1-butanol was replaced by 0.5 percent of 2-amino-1-butanol acetate. The same perfect release was obtained.

EXAMPLE 15

The procedure of Example 3 was repeated except that the polysiloxane also contained 10 percent of a linear dimethylpolysiloxane of viscosity 1000 cps. at 25° C. The same perfect release was obtained.

EXAMPLE 16

The procedure of Example 3 was repeated except that the polysiloxane also contained 5 percent of a resinous methylpolysiloxane of viscosity 40 cps. at 25° C. in a 34 percent solution, and having a $CH_3/Si$ ratio of 1.1:1. The same perfect release was obtained.

EXAMPLE 17

The procedure of Example 16 was repeated except that the amount of the methylpolysiloxane was 50 percent. The same perfect release was obtained.

EXAMPLE 18

The procedure of Example 3 was repeated except that the polysiloxane used was of viscosity 2500 cps. at 25° C. The same perfect release was obtained.

EXAMPLE 19

The procedure of Example 3 was repeated except that the triethoxysilane was used in the form of a 10 percent solution is isopropanol. The same perfect release was obtained.

EXAMPLE 20

The procedure of Example 7 was repeated except that the 2-amino-1-butanol was replaced by 0.5 percent of diethylamine. The same perfect release was obtained.

EXAMPLE 21

The procedure of Example 7 was repeated except that the 2-amino-1-butanol was replaced by 0.5 percent of tetraethylene pentamine. The same perfect release was obtained.

What we claim is:

1. A process for treating surfaces of wood, metal glass or enamel whereby an anti-stick surface is obtained comprising applying to said surface, in presence of a sufficient amount of acid so that the pH is not greater than 4, a liquid organo-silicon compound containing at least one $\equiv$Si—H linkage and at least three $\equiv$Si—OR linkages per molecule, where R is a monovalent hydrocarbon radical or a hydrocarbonoxy radical, allowing the surface to dry and thereafter applying thereto a linear organopolysiloxane containing at least one silicon-bonded hydroxyl group.

2. A process according to claim 1 wherein the organosilicon compound is a silane or a siloxane.

3. A process according to claim 1 wherein the organo groups in the organosilicon compounds are methyl, ethyl, propyl, butyl, phenyl, phenylethyl, vinyl or β-ethoxyethoxy groups.

4. A process according to claim 1 wherein the organosilicon compound is tris-isobutoxysilane, tris-(β-ethoxyethoxy)silane or 1,1,3,3,-tetraethoxydisiloxane.

5. A process according to claim 1 wherein the organosilicon compound is triethoxysilane.

6. A process according to claim 1 wherein the amount of organosilicon compound used is of the order of from 1.25 to 17 g./m.²

7. A process according to claim 1 wherein the organosilicon compound is diluted with a solvent before application.

8. A process according to claim 7 wherein the solvent is xylene or isopropanol.

9. A process according to claim 7 wherein the solvent is toluene.

10. A process according to claim 1 wherein the organosilicon compound is applied by brushing, spraying or wiping with a pad soaked therewith.

11. A process according to claim 1 wherein the acid is acetic acid.

12. A process according to claim 1 wherein the acid is incorporated in the organosilicon compound before it is applied to the surface.

13. A process according to claim 1 wherein the linear organopolysiloxane has a hydroxyl group at one or both ends of the chain.

14. A process according to claim 1 wherein the organo groups in the organopolysiloxane are phenyl, phenylethyl, cyclohexyl or vinyl groups.

15. A process according to claim 1 herein the organo groups in the organopolysiloxane are methyl groups.

16. A process according to claim 1 herein the amount of linear organopolysiloxane applied is from 3 to 17 g./m.$^2$.

17. A process according to claim 1 wherein the linear organopolysiloxane is applied by brushing, spraying or wiping with a pad soaked therewith.

18. A process according to claim 1 wherein the linear organopolysiloxane is dissolved in a solvent before application.

19. A process according to claim 18 wherein the solvent is toluene or xylene.

20. A process according to claim 1 wherein therein is incorporated in the linear organopolysiloxane containing at least one hydroxyl group not more than 20 percent by weight thereof of another organopolysiloxane.

21. A process according to claim 1 herein a catalyst is incorporated in the linear organopolysiloxane.

22. A process according to claim 21 herein the catalyst is dibutyl tin dilaurate, choline octoate or diethylamine.

23. A process according to claim 21 wherein the catalyst is aminobutanol.

24. A process according to claim 21 wherein the catalyst is used in amount from 0.25 to 1 percent by weight of the linear organopolysiloxane.

25. A process according to claim 24 herein the amount is from 0.4 to 0.6 percent.

26. A cooking utensil having a cooking surface coated according to the process of claim 1.

References Cited
UNITED STATES PATENTS

| | | | |
|---|---|---|---|
| 2,530,367 | 11/1950 | Hance et al. | |
| 2,688,006 | 8/1954 | Steinman | 117—72 X |
| 2,738,358 | 3/1956 | Wiberg et al. | |
| 2,979,420 | 4/1961 | Harper | 117—75 X |
| 3,133,891 | 5/1964 | Ceyzeriat. | |
| 3,202,542 | 8/1965 | Poje. | |
| 3,258,444 | 6/1966 | Santelli. | |
| 3,300,542 | 1/1967 | Hadlock. | |
| 3,318,717 | 5/1967 | Simpson | 117—72 X |

WILLIAM D. MARTIN, Primary Examiner

R. HUSACK, Assistant Examiner

U.S. Cl. X.R.

117—75, 124, 132, 161; 161—207